United States Patent
Toshiaki et al.

(10) Patent No.: US 7,391,687 B2
(45) Date of Patent: Jun. 24, 2008

(54) METHOD OF DETERMINING RECORDING POWER FOR RECORDABLE OPTICAL DISK IN OPTICAL DISK SYSTEM

(75) Inventors: Kitano Toshiaki, Suwon (KR); Soo-yong Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 552 days.

(21) Appl. No.: 10/683,364

(22) Filed: Oct. 10, 2003

(65) Prior Publication Data
US 2004/0076094 A1    Apr. 22, 2004

(30) Foreign Application Priority Data
Oct. 14, 2002    (KR) .................. 10-2002-0062572

(51) Int. Cl.
*G11B 7/00* (2006.01)
(52) U.S. Cl. .................................... 369/47.53
(58) Field of Classification Search ........ None
See application file for complete search history.

(56) References Cited

U.S. PATENT DOCUMENTS

| | | | |
|---|---|---|---|
| 5,303,217 A * | 4/1994 | Bakx et al. ............. | 369/47.53 |
| 5,721,856 A | 2/1998 | Takeuchi | |
| 6,052,347 A | 4/2000 | Miyata .................. | 369/54 |
| 6,557,126 B1 * | 4/2003 | Kelly ..................... | 714/708 |
| 6,937,548 B2 * | 8/2005 | Hsiao et al. ............ | 369/47.53 |
| 2002/0085470 A1 * | 7/2002 | Yokoi ..................... | 369/59.11 |
| 2002/0098806 A1 * | 7/2002 | Park ...................... | 455/67.6 |
| 2003/0035355 A1 * | 2/2003 | Morishima ............. | 369/47.53 |

FOREIGN PATENT DOCUMENTS

JP    9282696    10/1997

OTHER PUBLICATIONS

Bartholomeusz, Brian J., Dr., Running Optimum Power Control: Data Integrity in CD-Recording; OSTA, Jan. 7, 1998, pp. 1-11, Revision 1.0, OSTA, Santa Barbara, CA.

* cited by examiner

*Primary Examiner*—Thang V. Tran
*Assistant Examiner*—Christopher R Lamb
(74) *Attorney, Agent, or Firm*—Mills & Onello LLP

(57) ABSTRACT

A method of determining a recording power for a recordable optical disk in an optical disk system is provided. The method is capable of minimizing the time taken to determine an optimum recording power for each recording speed and thus improve recording performance.

2 Claims, 7 Drawing Sheets

METHOD OF DETERMINING RECORDING POWER FOR RECORDABLE OPTICAL DISK IN OPTICAL DISK SYSTEM

BACKGROUND OF THE INVENTION

This application claims the priority of Korean Patent Application No. 2002-62572, filed on Oct. 14, 2002, in the Korean Intellectual Property Office, the disclosure of which is incorporated herein in its entirety by reference.

1. Field of the Invention

The present invention relates to an optical disk system which records data on an optical disk inserted therein, and more particularly, to a method of determining recording power for an optical disk inserted into an optical disk system based upon a recording speed.

2. Description of the Related Art

When recording data on an optical disk using an optical disk system, an optimum recording power is obtained using optimum power calibration (OPC). Most contemporary CD-ROM drives use a constant linear velocity (CLV) recording method to record data. In the CLV recording method, the speed of recording data on a track near the center of an optical disk is the same as the speed of recording data on a track near the circumference of the optical disk. Thus, there are no problems regarding the recording of data using a single recording power obtained through OPC performed before the recording of the data. However, the requirements for increased data recording speed in optical disk systems make it almost impossible to record data on an optical disk using the CLV recording method because of mechanical and physical limits of the CLV recording method. As alternatives to the CLV recording method, a constant angular velocity (CAV) recording method and a zone-CLV recording method have been suggested. Especially, in the zone-CLV recording method, an optical disk is divided into a plurality of zones and then data is recorded on each of the zones according to the CLV recording method. For example, data is recorded on a track near the center of an optical disk at a speed of X16, while data is recorded on a track near the circumference of the optical disk at a speed of X24. According to these two methods, however, the speed of recording data on an optical disk varies depending on whether a track where the data is recorded is near the center or near the circumference of the optical disk.

When the speed of recording data on an optical disk varies depending on which track of the optical disk the data is recorded on, optical power needs to be changed in each region to accommodate the different data recording speeds. In the conventional approach, in the case of recording data on an optical disk using the CAV recording method or the zone-CLV recording method, it is necessary to determine an optimum recording power for each data recording speed by performing OPC two times, i.e., a first time for tracks near the center of the optical disk and a second time for tracks near the circumference of the optical track.

FIG. 1 is a diagram illustrating a conventional algorithm used for determining a recording power by performing OPC two times. The algorithm shown in FIG. 1 has been disclosed in Japanese Patent Publication No. hei 9-282696. Referring to FIG. 1, reference optimum recording powers A, C, and B for an inner track, a middle track, and an outer track of an optical disk are determined in advance through experiments. Thereafter, optimum recording powers A' and B' that are actually needed to record data on the inner track and the outer track are obtained by respectively performing OPC on the inner track and outer track of the optical disk. An optimum recording power C' that is necessary to record data on the middle track is obtained using the optimum recording powers A' and B', as shown in Equation (1) below.

$$A' - A = X \qquad (1)$$
$$B' - B = Y$$
$$C' = \frac{X+Y}{2} + C$$

The conventional algorithm, however, cannot be applied to the zone-CLV recording method because it only provides a median recording power of two optimum recording powers respectively for two different regions on an optical disk as an optimum recording power for a region therebetween. In other words, since in the zone-CLV recording method, an optical disk is divided into a plurality of zones and the plurality of zones have different data recording speeds, it is difficult to precisely provide an optimum power value for each of the zones simply using Equation (1). Also, the conventional algorithm is not appropriate for the CAV recording method because in the CAV recording method a considerable amount of calculations is necessary to provide an optimum power value for each desired data recording speed. For example, in order to record data on an optical disk at a speed of 48X, OPC must be performed on an inner track and an outer track of the optical disk and twenty or more calculation processes are needed to determine optimum recording powers for data recording speeds lower than 48X. Such considerable amount of calculations delays the entire data recording process and may deteriorate the performance of the data recording process.

SUMMARY OF THE INVENTION

The present invention provides a method of determining a recording power which is capable of effectively providing an optimum recording power for different data recording speeds of a recordable optical disk that is inserted into an optical disk system.

The present invention also provides a recording medium where computer-readable program codes enabling the method of determining a recording power are recorded.

According to an aspect of the present invention, there is provided a method of determining an optimum recording power for a recordable multi-speed optical disk having an inner power calibration area (PCA) inside a program region and an outer PCA outside the program region, the method to be performed in an optical disk system that records data on a recordable optical disk. The method involves (a) obtaining an optimum recording power for a minimum recording speed in the inner PCA and determining the obtained optimum recording power as a first optimum recording power; (b) obtaining an optimum recording power for a maximum recording speed in the outer PCA and determining the obtained optimum recording power as a second optimum recording power; and (c) determining linear characteristics of recording speeds and their corresponding optimum recording powers using the first and second optimum recording powers.

According to another aspect of the present invention, there is provided a method of determining an optimum recording power for a recordable multi-speed optical disk having an inner power calibration area (PCA) inside a program region and an outer PCA outside the program region, the method to be performed in an optical disk system that records data on a recordable optical disk. The method involves (a) obtaining experimental data concerning recording powers at non-linear points on the optical disk where recording speeds and their corresponding recording powers have non-linear characteristics and storing the experimental data in a predetermined region on the optical disk; (b) obtaining an optimum recording power for a minimum recording speed in the inner PCA and determining the obtained optimum recording power as a first optimum recording power; (c) obtaining an optimum recording power for a maximum recording speed in the outer PCA and determining the obtained optimum recording power as a second optimum recording power; (d) determining optimum recording powers at the non-linear points using the experimental data obtained in step (a) and the first and second optimum recording powers; and (e) determining linearity between recording speeds corresponding to two adjacent ones among the non-linear points and their corresponding recording powers.

According to still another aspect of the present invention, there is provided a method of determining an optimum recording power for a recordable optical disk having only one power calibration area (PCA) inside a program region, the method to be performed in an optical disk system that records data on a recordable optical disk. The method involves (a) obtaining experimental data concerning recording powers for various recording speeds of the optical disk and storing the experimental data; (b) determining an optimum recording power for a minimum recording speed in the PCA; (c) obtaining a difference between a recording power for the minimum recording speed included in the experimental data and the recording power obtained in step (b); and (d) determining optimum recording powers for the various recording speeds by adjusting the recording powers for the various recording speeds included in the experimental data by as much as the difference obtained in step (c).

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF PREFERRED EMBODIMENTS OF THE INVENTION

Hereinafter, a method of determining a recording power for a recordable optical disk according to a preferred embodiment of the present invention will be described more fully with reference to the accompanying drawings.

Figure 1:
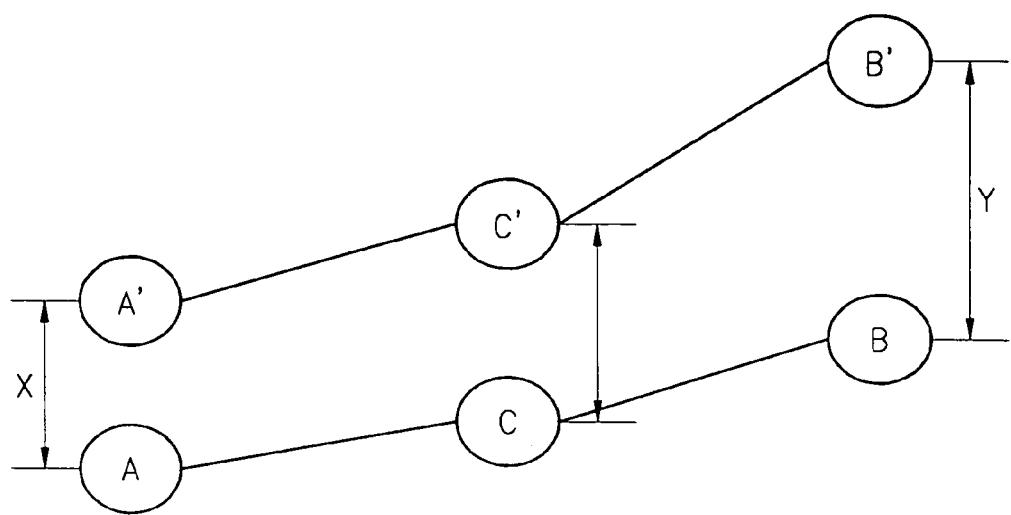
FIG. 1 is a diagram illustrating a conventional algorithm used for determining a recording power by performing optical power calibration two times.
Figure 2:
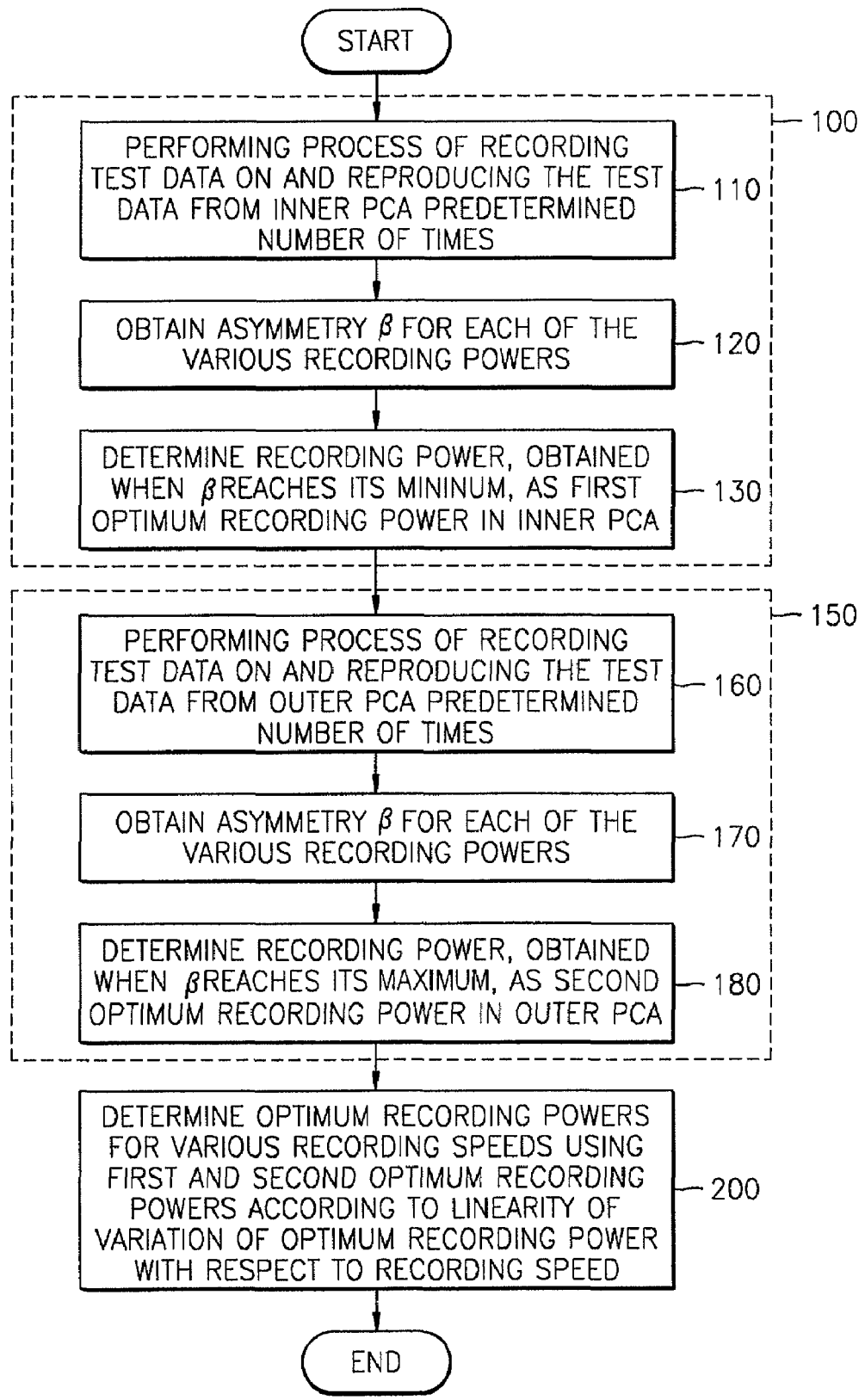
FIG. 2 is a flowchart of a method of determining a recording power for a recordable optical disk according to a preferred embodiment of the present invention.

FIG. 2 is a flowchart of a method of determining a recording power for a recordable optical disk according to a preferred embodiment of the present invention. In particular, FIG. 2 shows a method of determining an optimum recording power for a multi-speed optical disk. In the case of such a multi-speed optical disk, the optimum recording power with respect to recording speed has a linear variation.

In general, two power calibration areas (PCAs) exist on a multi-speed optical disk and are used to determine optimum recording power. One of the two PCAs is located inside a program region where data are recorded, and the other is located outside the program region. The PCA located inside the program region, i.e., an inner PCA, is used to determine an optimum recording power for a minimum recording speed, and the PCA located outside the program region, i.e., an outer PCA, is used to determine an optimum recording power for a maximum recording speed. Before recording data on the program region of the optical disk, optimum recording powers for different recording speeds are determined by performing optimum power calibration (OPC) on the inner PCA and the outer PCA. Linearity of the variation of optimum recording power with respect to recording speed can be determined by using the optimum recording powers for the minimum and maximum recording powers. In addition, by using the optimum recording powers for the minimum and maximum recording powers, optimum recording powers for recording speeds between the minimum and maximum recording speeds can be obtained.

Referring to FIG. 2, when an optical disk is inserted into an optical disk recording system, an optimum recording power for a minimum recording speed is obtained by performing OPC on an inner PCA of the optical disk and then is determined as a first optimum recording power in step 100.

More specifically, step 100 involves repeatedly performing a process of recording test data on and reproducing the test data from the inner PCA a predetermined number of times in step 110, using various recording powers. In step 120, asymmetry, β for each of the various recording power in each of the predetermined number of cycles is obtained using a peak value and a bottom value of the reproduced test data in each of the cycles. A method of calculating the asymmetry β of the reproduced test data in each of the cycles will be described in greater detail later with reference to FIG. 4. Thereafter, a recording power corresponding to a minimum asymmetry β is determined as the first optimum recording power in step 130.

After the first optimum recording power is determined, an optimum recording power for a maximum recording speed is obtained by performing OPC on an outer PCA of the optical disk and then is determined as a second optimum recording power in step 150.

More specifically, step 150 involves repeatedly performing a process of recording test data on and reproducing the test data from the outer PCA a predetermined number of times in step 160, using various recording powers. In step 170, asymmetry β for each of the various recording powers in each of the predetermined number of cycles is obtained using a peak value and a bottom value of the reproduced test data in each of the cycles. Thereafter, a recording power corresponding to a minimum asymmetry β is determined as the second optimum recording power in step 180.

Figure 3:
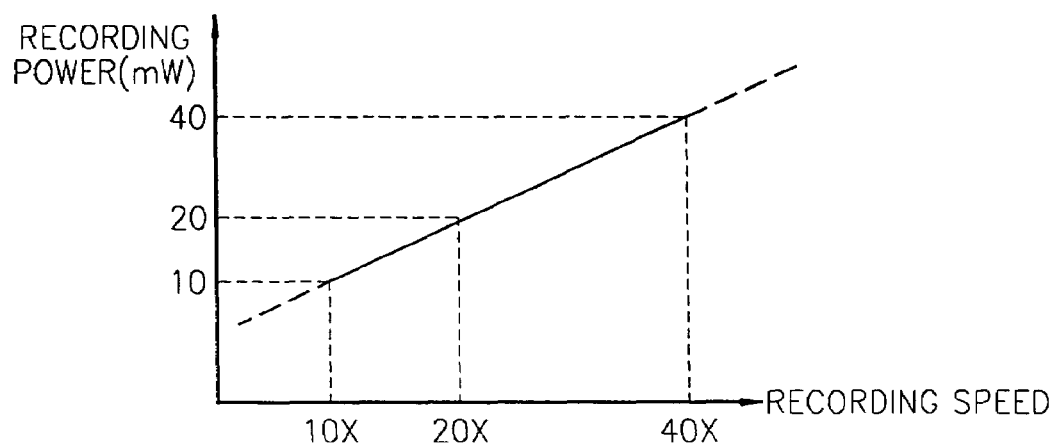
FIG. 3 is a graph showing a linear variation of optimum recording power with respect to recording speed.

In step 200, linear characteristics of various recording speeds and their corresponding optimum recording powers are determined using the first and second optimum recording powers determined in steps 100 and 150, respectively. For example, supposing that an optimum recording power for a minimum recording speed of 10X at the inner PCA is 10 mW and an optimum recording power for a maximum recording speed of 40X at the outer PCA is 40 mW, recording speeds between the minimum and maximum recording speeds and their respectively optimum recording powers have linear characteristics, as shown in FIG. 3.

The linear characteristics that the various recording speeds and their corresponding optimum recording powers have make it possible to determine optimum recording powers for various recording speeds between the maximum recording speed and the minimum speed. For example, under the above example, referring to FIG. 3, an optimum recording power for a recording speed of 20X is 20 mW.

In a case where recording speeds and their corresponding recording powers have linear characteristics, the linear characteristics can be determined using optimum recording powers for maximum and minimum recording speeds that are obtained through OPC, and it is possible to determine optimum recording powers for various recording speeds based on the linear characteristics. This method of determining an optimum recording power can be applied to a constant angular velocity (CAV) recording method and a zone-CLV recording method.

Figure 4:
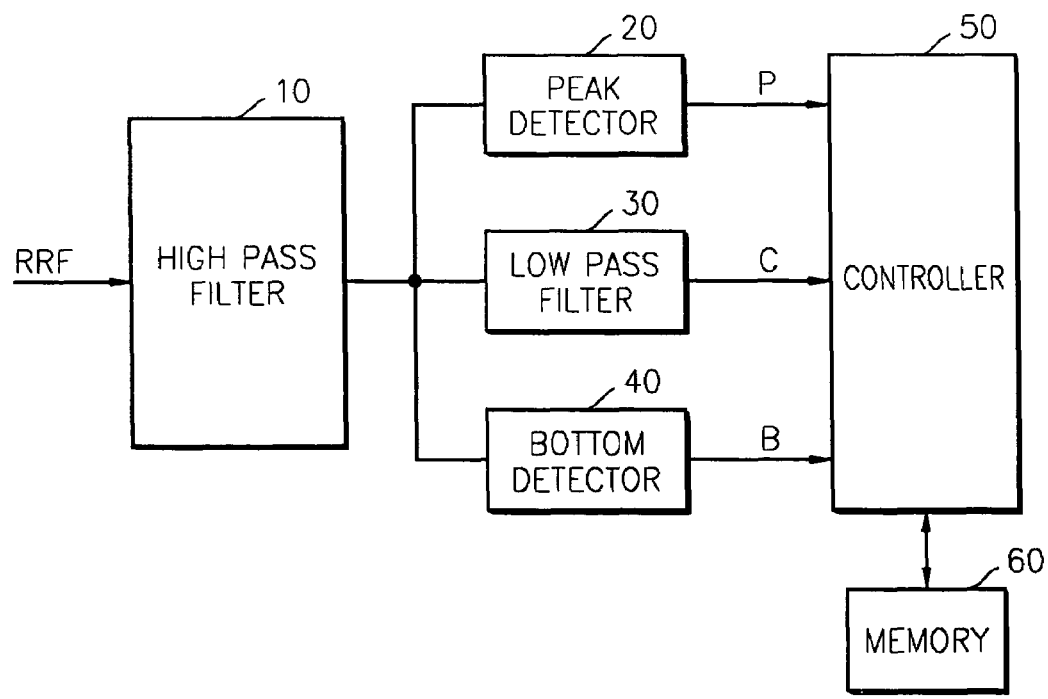
FIG. 4 is a block diagram of an apparatus for obtaining asymmetry β of data reproduced using an optical disk system.

FIG. 4 is a block diagram of an apparatus for obtaining asymmetry β of data reproduced from an optical disk using an optical disk system. Referring to FIG. 4, the apparatus includes a high pass filter 10, a peak detector 20, a low pass filter 30, a bottom detector 40, a controller 50, and a memory 60.

The high pass filter 10 removes low frequency noise from a reproduced signal RRF input from an optical pickup of an optical disk system (not shown) by performing high pass filtering on the reproduced signal RRF.

The peak detector 20 detects a peak value P of the noise-removed reproduced signal, and the bottom detector 40 detects a bottom value B of the noise-removed reproduced signal. The low pass filter 30 extracts a median value C of DC level by performing low pass filtering on the noise-removed reproduced signal.

The controller 50 calculates asymmetry β of the reproduced signal RRF using the peak value P, the bottom value B, and the median value C, which is shown in Equation (2) below.

$$\beta = \left| C - \frac{P-B}{P+B} \right| \quad (2)$$

The controller 50 stores the asymmetry β of the reproduced signal RRF in the memory 60. Thereafter, a recording power corresponding to a minimum value of the asymmetry β of the reproduced signal RRF is determined as an optimum recording power.

The method of determining an optimum recording power for an optical disk where recording powers and their corresponding recording powers have linear characteristics has been described so far. However, an optical disk of poor quality may not be able to guarantee such linear characteristics of the recording speeds and their corresponding recording powers.

Figure 5:
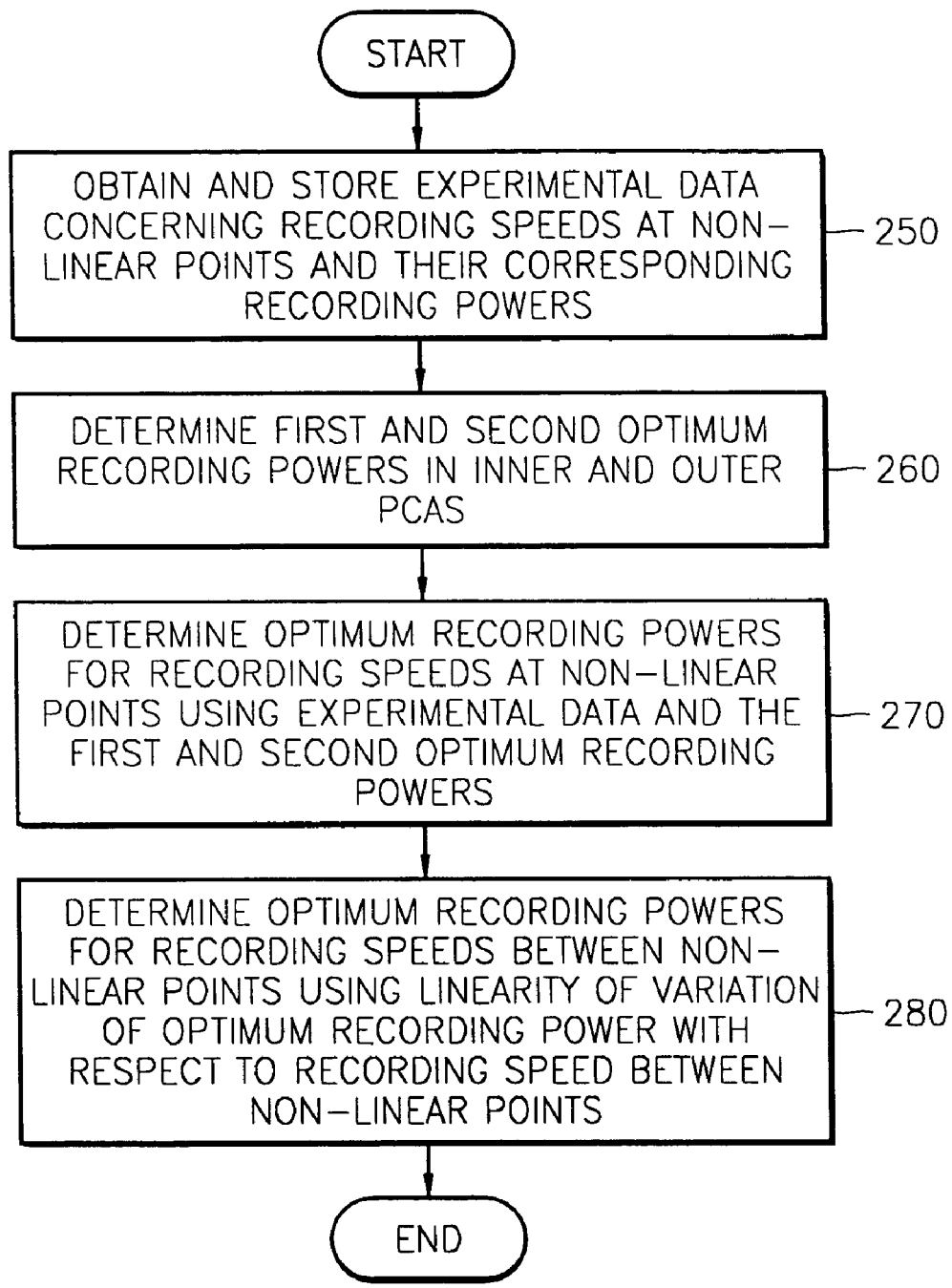
FIG. 5 is a diagram showing a non-linear variation of optimum recording power with respect to recording speed.

FIG. 5 is a flowchart of a method of determining recording power for a recordable optical disk according to another preferred embodiment of the present invention. In FIG. 5, in the case of the recordable optical disk, recording speeds and their corresponding recording powers have non-linear characteristics.

Figure 6:
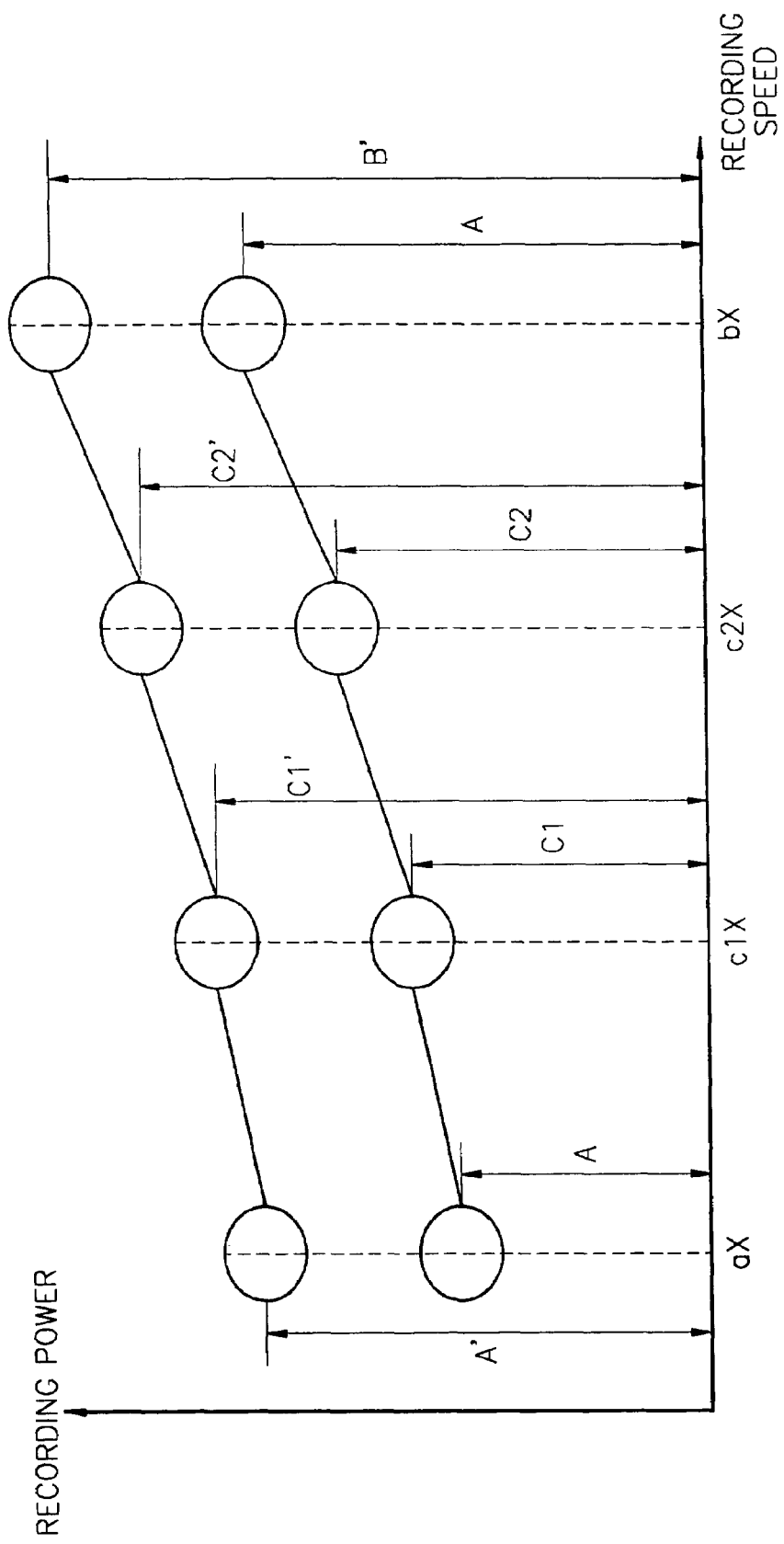
FIG. 6 is a flowchart of a method of determining a recording power for a recordable optical disk according to another preferred embodiment of the present invention;.

FIG. 6 is a diagram illustrating non-linear characteristics of recording speeds and their corresponding recording powers.

Referring to FIGS. 5 and 6, in the case of an optical disk where recording power varies non-linearly with respect to recording speed, experimental data concerning recording powers for a minimum recording speed, a maximum recording speed, and predetermined recording speeds therebetween at non-linear points where recording power non-linearly varies with respect to recording speed are obtained and stored in a predetermined region on an optical disk in step 250. For example, the experimental data can be stored in an inner PCA of the optical disk. In FIG. 6, A represents a recording power for a minimum recording speed, B represents a recording power for a maximum recording speed, C1 represents a recording power at a first non-linear point, and C2 represents a recording power at a second non-linear point. For the convenience of explanation, only two non-linear points are illustrated. However, the number of non-linear points may vary depending on the characteristics of an optical disk.

When the optical disk where the experimental data concerning the recording powers for the minimum recording speed, the maximum recording speed, and the non-linear points are stored is inserted into an optical disk system, a first optimum recording power A' for the minimum recording speed is determined by performing OPC on the inner PCA of the optical disk and a second optimum recording power B' for the maximum recording power is determined by performing OPC on the outer PCA of the optical disk in step 260. Here, the first optimum recording power A' can be obtained by performing steps 110 through 130 of FIG. 2 and the second optimum recording power B' can be performed by performing steps 160 through 180 of FIG. 2.

Thereafter, in step 270, optimum recording powers C1' and C2' at the first and second non-linear points are obtained in step 270 by using the experimental data concerning the recording powers C1 and C2 at the first and second non-linear points and the first and second optimum recording powers A' and B'. In particular, the optimum recording powers C1' and C2' at the first and second non-linear points can be obtained using Equation (3) below.

$$C1' = \frac{C1-A}{B-A}(B'-A') + A' \quad (3)$$
$$C2' = \frac{C2-A}{B-A}(B'-A') + A'$$

Based on Equation (3) which expresses the optimum recording powers C1' and C2' at the first and second non-linear points, an optimum recoding power Cn' at an n-th non-linear point can be expressed as shown in Equation (4) below.

$$Cn' = \frac{Cn-A}{B-A}(B'-A') + A' \quad (4)$$

In Equation (4), Cn represents experimental data concerning a recording power at the n-th non-linear point obtained through experiments.

Thereafter, in step 280, linear characteristics between recording speeds respectively corresponding to two adjacent non-linear points are determined and optimum recording powers for other recording speeds between the recording speeds are determined based on the determined linear characteristics. As shown in FIG. 6, every two adjacent recording speeds, among recording speeds aX, c1X, c2X, and bX, and their corresponding recording powers have linear characteristics. Therefore, such linear characteristics can be determined on a. section-by-section basis using two adjacent recording speeds among aX, c1X, c2X, and bX and their respective recording powers. Here, one section ranges between two adjacent recording speeds among aX, c1X, c2X, and bX. For example, the linear characteristics of various recording speeds between the recording speeds aX and c1X are determined using aX and c1X and optimum recording powers A' and C1'. Likewise, the linear characteristics of various recording speeds between the recording speeds c1X and c2X and between the recording speeds c2x and bx are determined using c1x, c2x, c1' and C2, and c2x, bx, C2', and B', respectively. Accordingly, it is possible to determine optimum recording powers for various recording speeds using the linear characteristics determined in each section.

Figure 7:
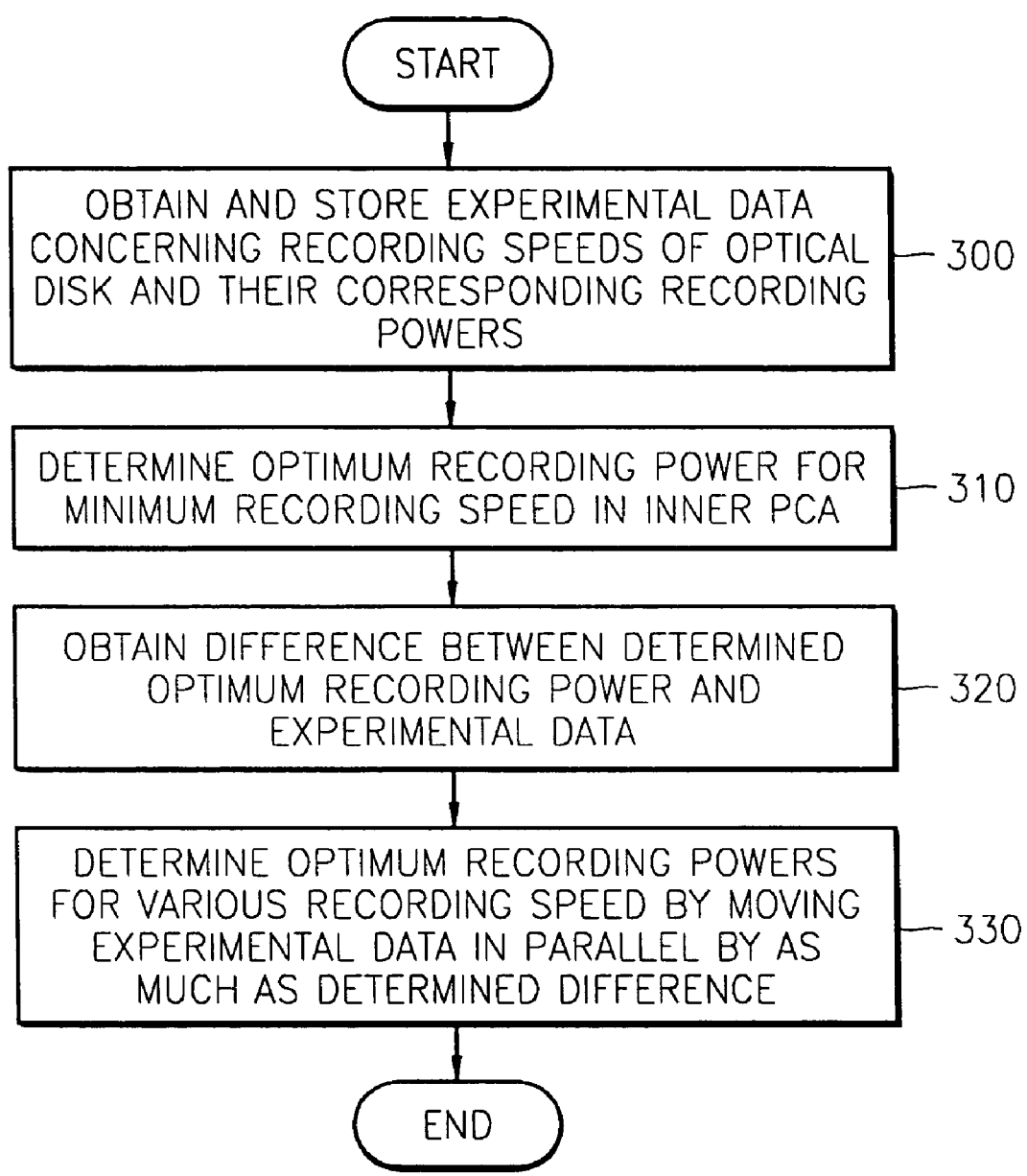
FIG. 7 is a flowchart of a method of determining a recording power according to still another preferred embodiment of the present invention.

FIG. 7 is a flowchart of a method of determining a recording power for a recordable optical disk according to another preferred embodiment of the present invention. In particular, FIG. 7 is a flowchart of a method of determining an optimum for a CD-RW or CD-R where a PCA only exists inside a program region, and FIG. 8 is a graph illustrating the method of determining a recording power for a recordable optical disk of FIG. 7.

Figure 8:
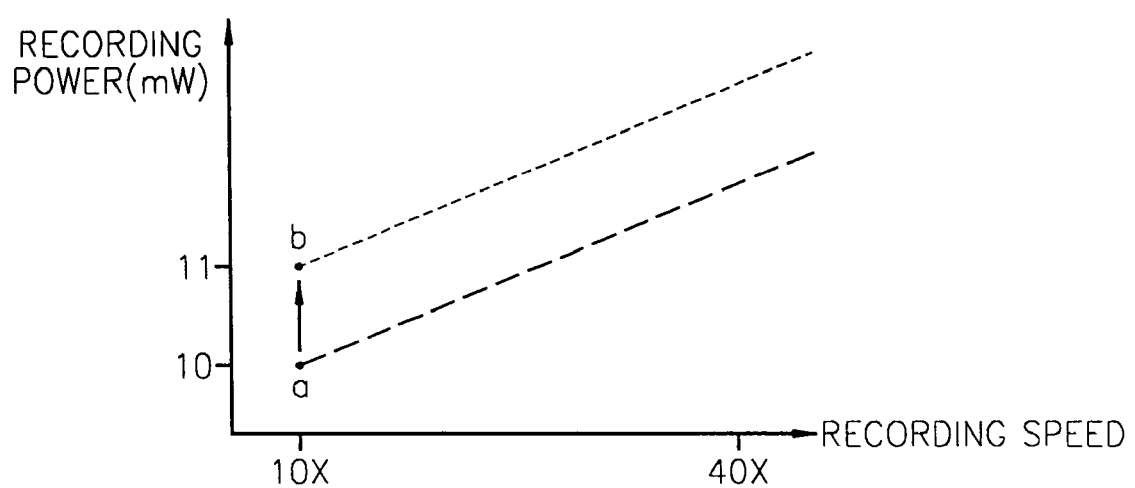
FIG. 8 is a graph illustrating the process of determining an optimum data recording speed shown in FIG. 7

Referring to FIGS. 7 and 8, in the case of a CD-RW or CD-R, a PCA only exists inside a program region. Accordingly, OPC can be performed on the inner PCA only one time. In this case, recording powers for various recording speeds are determined in advance through experiments and stored in a predetermined region of the optical disk in step 300. For example, the experimental data concerning the recording powers for various recording speeds can be stored in the inner PCA of the optical disk. In step 300, as shown in FIG. 8, experimental data 'a' concerning recording speeds and their corresponding recording powers is obtained through experiments. Assume that according to the experimental data 'a', a recording power corresponding to a minimum recording speed of 10X is 10 mW. Even though FIG. 8 illustrates recording power as linearly varying with respect to recording speed, it may not linearly vary with respect to recording speed.

When the optical disk where the experimental data 'a' is stored is inserted into an optical disk system, an optimum recording power 'b' for a minimum recording speed is determined in step 310 by performing OPC on the inner PCA. Here, the optimum recording power 'b' for a minimum recording speed can be determined by performing steps 110 through 130 of FIG. 2. FIG. 8 shows that the optimum recording power 'b' for a minimum recording speed of 10X is 11 mW.

After step 310, a difference between the recording power 'a' and the optimum recording power 'b' for the minimum recording speed is obtained in step 320. Referring to FIG. 8, an offset of 1 mW exists between 'a' and 'b'.

Thereafter, in step 330, the recording powers for various recording speeds obtained in step 300 are moved upward in parallel by as much as the difference obtained in step 320. Since the difference between the recording power 'a' and the optimum recording power 'b' for the minimum recording speed is 1 mW, optimum recording mediums for the various recording speeds can be obtained by moving the experimental data 'a' shown in FIG. 8 upward by as much as 1 mW.

As described above, in the case of an optical disk on which OPC can be performed only one time, recording powers for various recording speeds are determined in advance through experiments and then are adjusted by as much as a difference between the one corresponding to a minimum recording speed among themselves and an optimum recording power for the minimum recording speed obtained by performing OPC on the optical disk only one time, thus obtaining optimum recording powers for the various recording speeds.

The present invention can be realized as computer-readable program codes recorded on a computer-readable recording medium. The computer-readable recording medium can be any kind of recording medium on which computer-readable data can be recorded. In particular, the computer-readable recording medium includes a ROM, a RAM, a CD-ROM, a magnetic tape, a floppy disk, and an optical data storage, The computer-readable recording medium can be distributed over computer systems connected to a network, and thus computer-readable program codes can be stored or executed on the computer-readable recording medium in a decentralized manner.

As described above, the method of determining a recording power for a recordable optical disk according to the present invention is capable of minimizing the time taken to determine an optimum recording power for each recording speed and thus improving recording performance.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of determining an optimum recording power for a recordable multi-speed optical disk having an inner power calibration area (PCA) inside a program region and an outer PCA outside the program region, the method to be performed in an optical disk system that records data on a recordable optical disk, the method comprising:

(a) obtaining an optimum recording power for a minimum recording speed in the inner PCA and determining the obtained optimum recording power as a first optimum recording power, wherein step (a) comprises:

(a1) performing a process of recording data on and reproducing the data from the inner PCA using a predetermined number of cycles, using various recording powers;

(a2) obtaining an asymmetry of data reproduced from the inner PCA in each of the predetermined number of cycles, wherein obtaining the asymmetry of data reproduced from the inner or outer PCA in each of the predetermined number of cycles comprises:

removing low frequency noise from the reproduced data by performing high pass filtering on the reproduced data;

detecting a peak value and a bottom value of the noise-removed reproduced data;

extracting a median value of a DC level by performing low pass filtering on the noise-removed reproduced data; and obtaining asymmetry of the noise-removed reproduced data using the following equation:

$$\beta = \left| C - \frac{P-B}{P+B} \right|$$

where β represents asymmetry, C represents a low-pass-filtered median value, P represents the peak value, and B represents the bottom value; and (a3) determining a recording power obtained when the asymmetry obtained in step (a2) reaches its minimum as the first optimum recording power;

(b) obtaining an optimum recording power for a maximum recording speed in the outer PCA and determining the obtained optimum recording power as a second optimum recording power; and (c) determining linear characteristics of recording speeds and their corresponding optimum recording powers using the first and second optimum recording powers.

2. A method of determining an optimum recording power for a recordable multi-speed optical disk having an inner power calibration area (PCA) inside a program region and an outer PCA outside the program region, the method to be performed in an optical disk system that records data on a recordable optical disk, the method comprising:

(a) obtaining an optimum recording power for a minimum recording speed in the inner PCA and determining the obtained optimum recording power as a first optimum recording power;

(b) obtaining an optimum recording power for a maximum recording speed in the outer PCA and determining the obtained optimum recording power as a second optimum recording power, wherein step (b) comprises:

(b1) performing a process of recording data on and reproducing the data from the outer PCA a predetermined number of times, using various recording powers;

(b2) obtaining asymmetry of data reproduced from the outer PCA in each of the predetermined number of cycles, wherein obtaining the asymmetry of data reproduced from the inner or outer PCA in each of the predetermined number of cycles comprises:

removing low frequency noise from the reproduced data by performing high pass filtering on the reproduced data;

detecting a peak value and a bottom value of the noise-removed reproduced data;

extracting a median value of a DC level by performing low pass filtering on the noise-removed reproduced data; and obtaining asymmetry of the noise-removed reproduced data using the following equation:

$$\beta = \left| C - \frac{P-B}{P+B} \right|$$

where β represents asymmetry, C represents a low-pass-filtered median value, P represents the peak value, and B represents the bottom value; and (b3) determining a recording power obtained when the asymmetry obtained in step (b2) reaches its minimum as the second optimum recording power; and (c) determining linear characteristics of recording speeds and their corresponding optimum recording powers using the first and second optimum recording powers.

* * * * *